(12) United States Patent
Fuhst et al.

(10) Patent No.: US 7,478,982 B2
(45) Date of Patent: Jan. 20, 2009

(54) TUBULAR CUTTING DEVICE

(75) Inventors: Karsten Fuhst, Hannover (DE); Sven Krueger, Winsen (DE)

(73) Assignee: Baker Hughes, Incorporated, Houston, TX (US)

( * ) Notice: Subject to any disclaimer, the term of this patent is extended or adjusted under 35 U.S.C. 154(b) by 66 days.

(21) Appl. No.: 11/585,447

(22) Filed: Oct. 24, 2006

(65) Prior Publication Data

US 2008/0092356 A1   Apr. 24, 2008

(51) Int. Cl.
*B23C 1/00*   (2006.01)
*B23B 41/00*   (2006.01)

(52) U.S. Cl. .................. 409/143; 29/56.5; 166/55.7
(58) Field of Classification Search .............. 29/56.5, 29/33 T; 409/65, 70, 143, 144, 183, 191, 409/200; 166/55.7
See application file for complete search history.

(56) References Cited

U.S. PATENT DOCUMENTS

| | | | |
|---|---|---|---|
| 1,814,058 A | 7/1931 | Powers | |
| 3,396,795 A | 8/1968 | Venghiattis | |
| 4,813,828 A * | 3/1989 | Beck et al. | 409/132 |
| 6,386,797 B1 * | 5/2002 | Gearhart | 166/55.7 |
| 6,821,063 B2 * | 11/2004 | Debat et al. | 409/143 |
| 6,868,901 B2 * | 3/2005 | Mason et al. | 166/55.7 |
| 6,962,216 B2 | 11/2005 | Zupanick | |
| 7,063,155 B2 | 6/2006 | Ruttley | |
| 2002/0043404 A1 | 4/2002 | Trueman et al. | |
| 2002/0050409 A1 | 5/2002 | Nackerud | |
| 2003/0010497 A1 | 1/2003 | Begg et al. | |
| 2003/0183424 A1 | 10/2003 | Tulloch | |
| 2004/0045714 A1 | 3/2004 | McGavern, III et al. | |
| 2004/0129420 A1 | 7/2004 | Hart et al. | |
| 2005/0023044 A1 | 2/2005 | Schuffenhauer et al. | |
| 2005/0133224 A1 | 6/2005 | Ruttley | |
| 2005/0173123 A1 | 8/2005 | Lund et al. | |
| 2006/0016603 A1 | 1/2006 | Webster et al. | |
| 2006/0137877 A1 | 6/2006 | Watson et al. | |
| 2006/0254773 A1 | 11/2006 | Schlegelmilch et al. | |
| 2007/0012449 A1 | 1/2007 | Cruickshank et al. | |

* cited by examiner

*Primary Examiner*—Dana Ross
(74) *Attorney, Agent, or Firm*—Bracewell & Giuliani LLP

(57) ABSTRACT

The casing cutter disclosed herein is useful for severing downhole tubulars and comprises a body, a cutting head, cutting blades, and actuators for operating the cutting head and cutting blades. Cutting is accomplished by rotatingly actuating the cutting head with an associated motor, and then radially extending the cutting blades away from the cutting head. In one embodiment, the cutting head includes a cutting member that pivotally extends from the cutting head upon rotation of the cutting head. In another embodiment, cutting members extend from the cutting head due to centrifugal forces associated with rotating the cutting head.

18 Claims, 5 Drawing Sheets

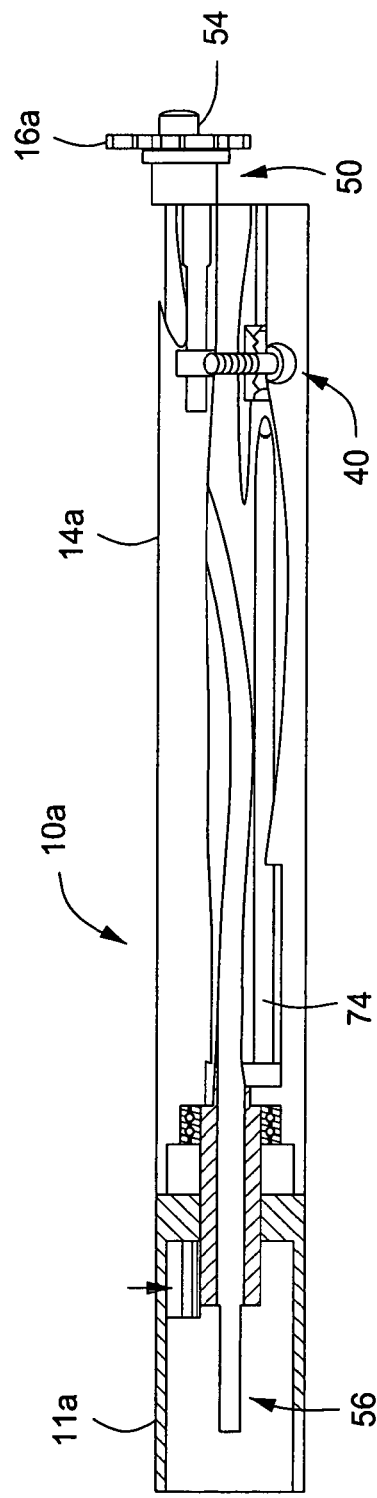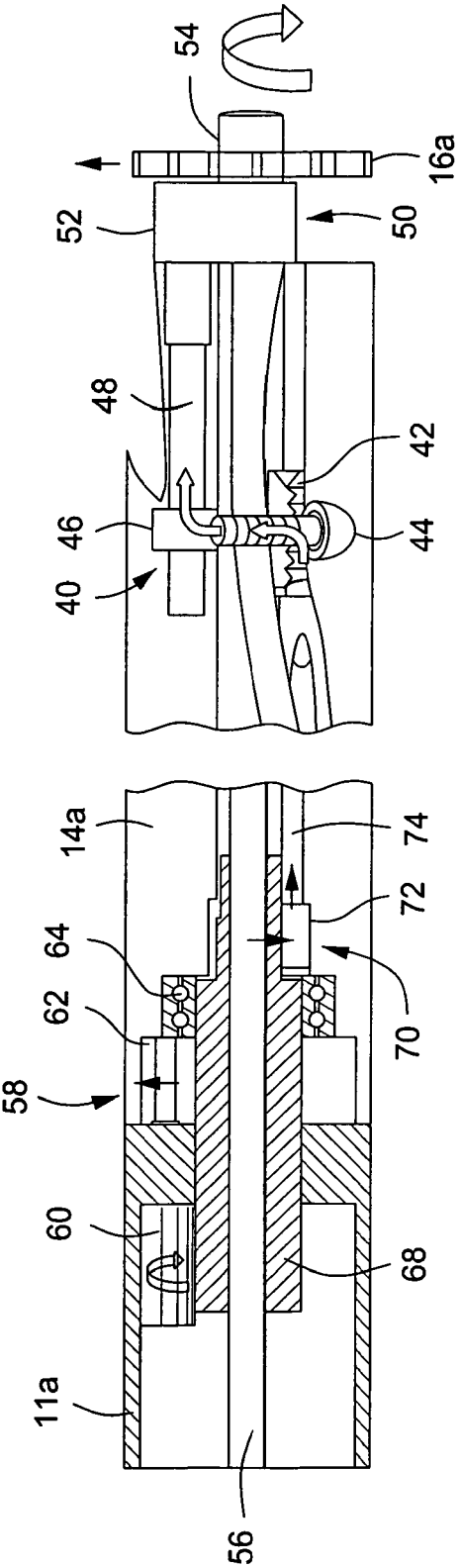
FIG. 4A
FIG. 4B

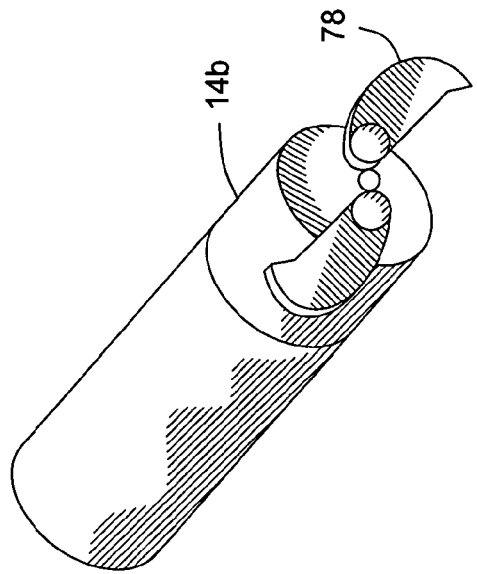
FIG. 5C
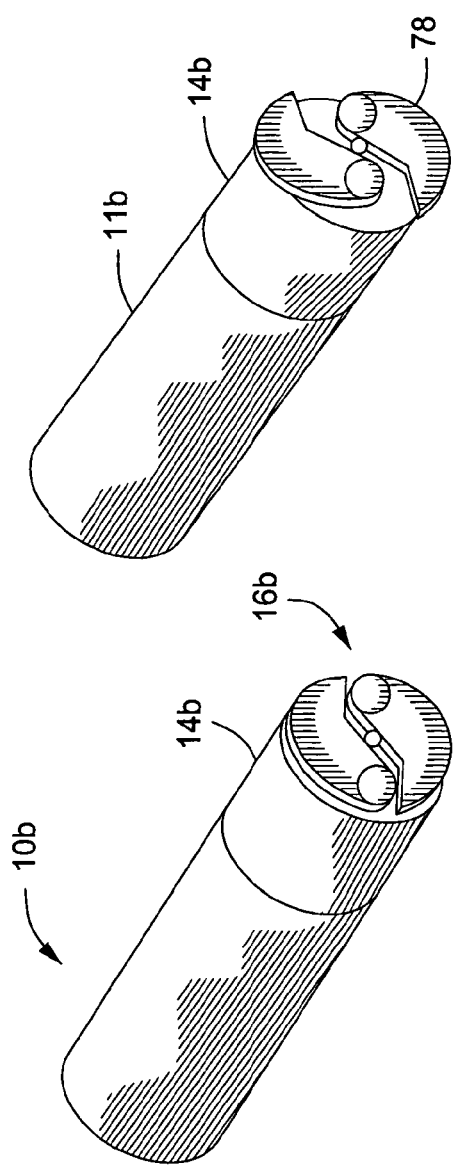
FIG. 5B
FIG. 5A
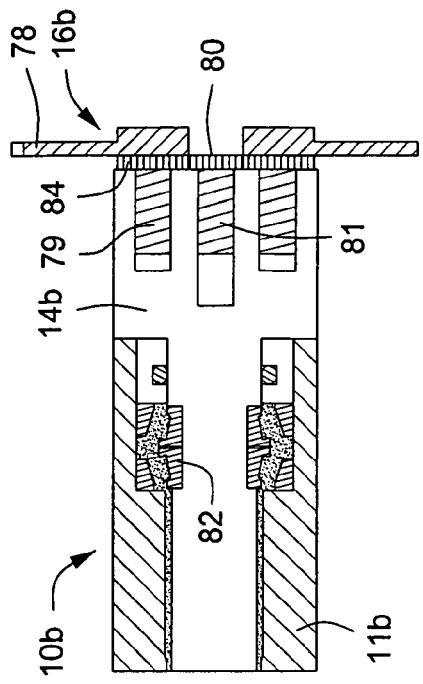
FIG. 5E
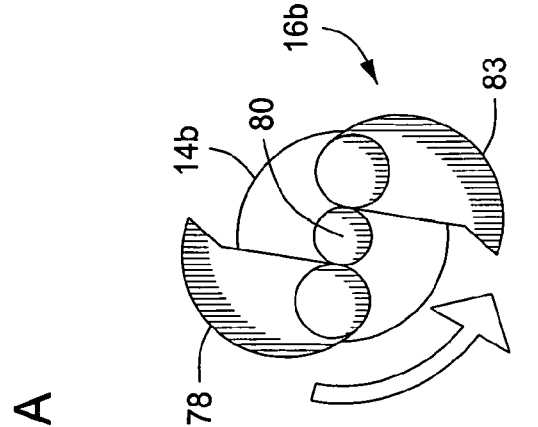
FIG. 5D

TUBULAR CUTTING DEVICE

BACKGROUND OF THE INVENTION

1. Field of the Invention

The disclosure herein relates generally to the field of severing a tubular member. More specifically, the present disclosure relates to an apparatus for cutting downhole tubulars.

2. Description of Related Art

Tubular members, such as casing for wellbores, pipelines, structural supports, fluids handling apparatus, and other items having a hollow space can be severed from the inside by inserting a cutting device within the hollow space. As is well known, hydrocarbon producing wellbores are lined with tubular members, such as casing, that are cemented into place within the wellbore. Additional members such as packers and other similarly shaped well completion devices are also used in a wellbore environment and thus secured within a wellbore. From time to time, portions of such tubular devices may become unusable and require replacement. On the other hand, some tubular segments have a pre-determined lifetime and their removal may be anticipated during completion of the wellbore. Thus when it is determined that a tubular needs to be severed, either for repair, replacement, demolishment, or some other reason, a cutting tool can be inserted within the tubular, positioned for cutting at the desired location, and activated to make the cut. These cutters are typically outfitted with a blade or other cutting member for severing the tubular. The device is also configured to rotationally advance the blade against the tubular and cut it from the inside. In the case of a wellbore, where at least a portion of the casing is in a vertical orientation, the cutting tool is lowered (such as by wireline, tubing, or slickline) into the casing to accomplish the cutting procedure.

BRIEF SUMMARY OF THE INVENTION

The present disclosure includes a cutting tool for cutting a tubular comprising, a drive system, a cutting head mechanically coupled to the drive system, and a cutting member pivotally mounted on the cutting head, wherein the cutting member is in mechanical communication with the drive system.

Also included herein is a cutting tool for severing a tubular downhole comprising, a power delivery system, a rotatable cutting head mechanically coupled with the power delivery system, and a cutting assembly disposed on the cutting head, the cutting assembly comprising a transmission and a cutting member, wherein the cutting assembly pivotally extends into a cutting position during rotation of the cutting head.

Yet another embodiment disclosed herein includes a tubular cutting device comprising, a power system, a cutting head, a tubular cutting system disposed on the cutting head, and a tubular cutting positioning mechanism coupled to the cutting system.

The present disclosure also includes a tubing cutter comprising, a body and a cutting element disposed on the body, wherein the cutting element is put into a cutting position by the centrifugal force resulting from rotation of the body. More than one cutting element may be included with the body. Also included is an optional synchronizing element coupled to the cutting element.

BRIEF DESCRIPTION OF THE SEVERAL VIEWS OF THE DRAWING

FIGS. 4a and 4b are cut-away side views of an embodiment of a cutting tool.
FIGS. 5a-5c are perspective views of an embodiment of a cutting tool.
FIG. 5d is a bottom view of a cutting tool.
FIG. 5e is a cut-away view of a cutting tool.

DETAILED DESCRIPTION OF THE INVENTION

The device disclosed herein is useful for cutting tubulars, including those disposed within a hydrocarbon producing wellbore. The device, referred to herein as a cutting tool, is capable of being inserted into a wellbore and of being secured therein. The cutting tool is equipped with a cutting member extendable from the body of the device for cutting a tubular wall in a radial configuration thereby severing the tubular. The cutting member can then be retracted from the cutting position and the device removed from within the tubular.

Figure 1:
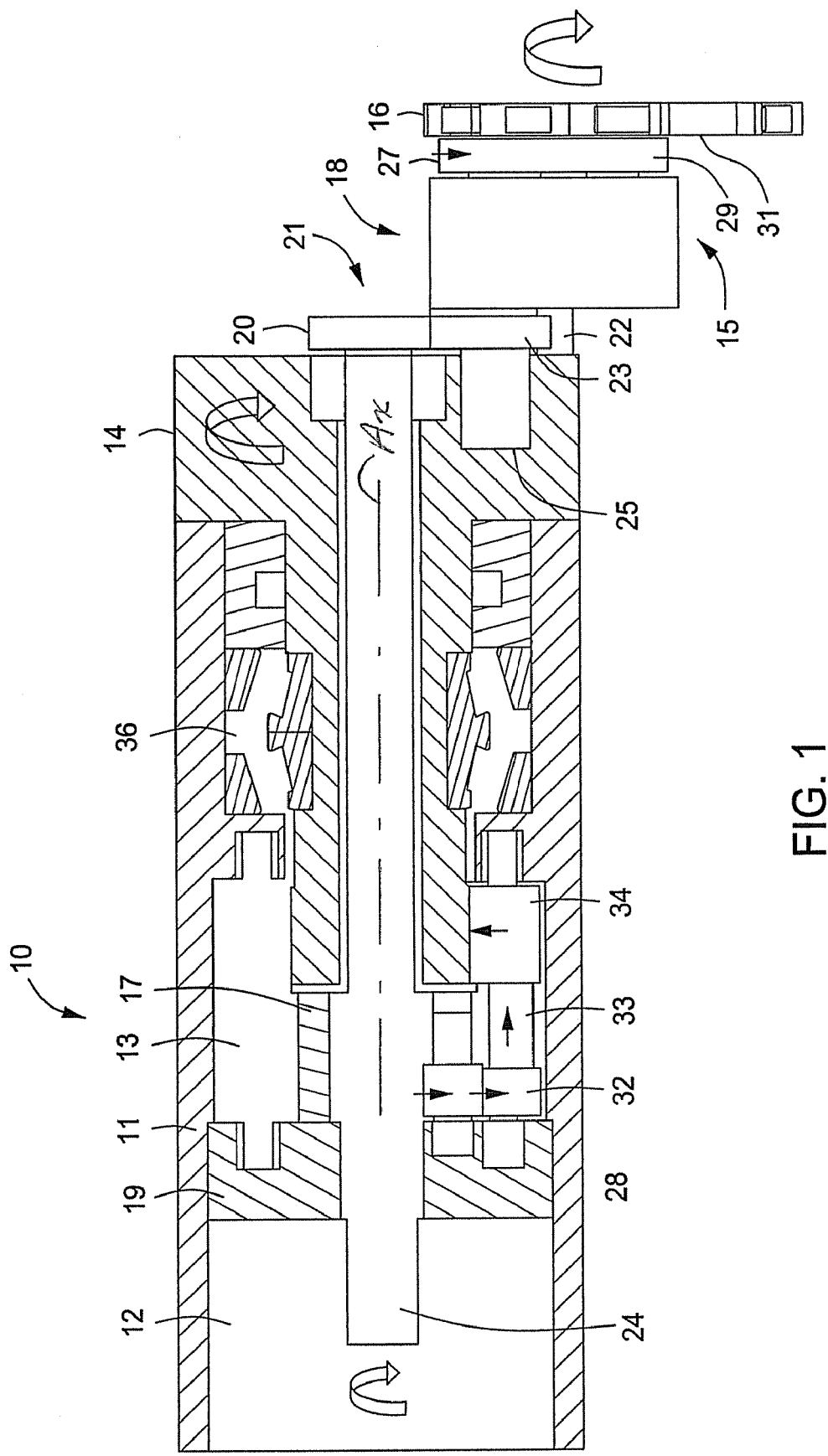
FIG. 1 illustrates a partial cut-away view of a cutting tool.

With reference now to FIG. 1 one embodiment of such a cutting tool 10 is disclosed in a partial cut-away view. As shown, the cutting tool 10 comprises a body 11 formed to receive a cutting head 14 coaxially on one of its ends and a cutting system 15 coupled to the free end of the cutting head 14. Coaxially disposed within the body 11, and coaxially extending along the axis $A_x$ of the cutting head 14 is a drive system 12. The drive system 12 (also referred to herein as a power delivery system) comprises a drive shaft 24 connected on one end to a rotational motive source for rotating the drive shaft 24 and terminates approximate to the free end of the cutting head 14. The drive system 12 however can include any device or system for delivering mechanical energy to the devices herein described. Asymmetrically disposed within the body 11 and proximate to the upper end of the cutting head 14 is an upper transmission 28. The upper transmission comprises a first gear 30, a second gear 32, and a third gear 34. The first gear 30 is disposed substantially parallel to the drive shaft 24, corresponding gear teeth are formed along the outer circumference of the first gear 30 and drive shaft 24 for rotational cooperative mating between these two elements. Similarly, the second gear 32 is disposed substantially parallel to the first gear 30 and also has a series of gear teeth formed for mating with the gear teeth of the first gear 30. The second gear 32 is mechanically coupled to the third gear 34 via a shaft that runs substantially coaxially between these two gears. The third gear 34 lies substantially parallel to the cutting head and is disposed adjacent the upper end of the outer circumference of the cutting head 14. Corresponding mating gears are formed on the outer surface of the third gear 34 to mate with the gears formed on this outer surface of the upper end of the cutting head 14. Optionally, an additional second gear 13 and third gear 34 may be included oppositely disposed within the housing 11. In yet another embodiment, more sets of second and third gears may be built-in, wherein the sets of second and third gears are radially located within the housing 11 substantially equidistant apart. Bearings 36 may be disposed in a space defined by the outer circumference of the upper portion of the cutting head 14 and the inner circumference of the body 11. Optionally a bulkhead 19 may be provided along a portion of the drive shaft 24. In the embodiment shown, the bulkhead has a substantially disk like configuration with an aperture formed through its axis formed to receive the drive shaft 24. Additionally the bulkhead 19 may serve as a structural support for the first and second gears (30, 32).

In the embodiment of FIG. 1, the diameter of the free end of the cutting head 14 is largely the same as the diameter of the housing 11. The cutting head 14 diameter is reduced at its upper end so that it can be inserted into the body 11. Additionally, a coaxial aperture is provided along the length of the cutting head 14 formed for positioning the drive shaft 24 there through.

The cutting system 15, as shown, comprises a gear train 20 coupled with a lower transmission 18 and a cutting member 16. The gear train 20 comprises an inner gear 21 shown affixed to the terminal end of the drive shaft 24. A radial gear 23 is provided in substantially the same plane as the inner gear 21 and wherein corresponding gear teeth are formed on the outer surfaces of these two gears (21, 23) for mating cooperation between these two gears. The radial gear 23 is coaxially affixed to a shaft 25 shown extending into the free end of the cutting head 14. On the opposite end of the shaft 25 the radial gear 23 is coupled with the lower transmission 18. Although not shown herein, as its name suggests the transmission 18 comprises a series of gears for adjusting the rotational torque and velocity between the radial gear 23 and the first cutting member gear 27.

On the end of the lower transmission 18 opposite where it couples with the gear train 20 is the cutting member 16 and its associated gears. More specifically a first member cutting gear 27 is shown joined to the output of the lower transmission 18. Gearingly coupled with the first cutting member gear 27 is the second cutting member gear 29, wherein the first and second cutting member gears (27, 29) lie in substantially the same plane. A post 31 is coaxially situated within the second cutting member gear 29 on which the cutting member 16 is mounted. It should be pointed out that the cutting member 16 may comprise a circular blade, a grinding disk, a milling disk, a sawing disk, or any other apparatus suitable for the cutting or severing of a tubular.

Figure 2B:
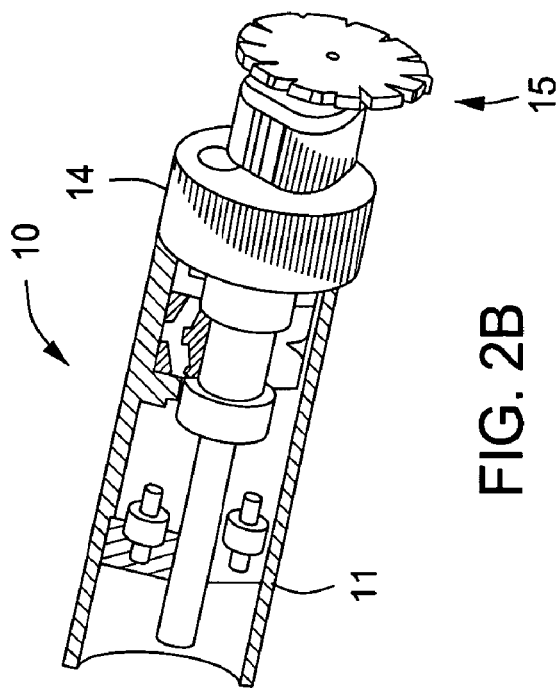
FIGS. 2a and 2b are partial cut-away perspective views of a cutting tool.
Figure 2A:
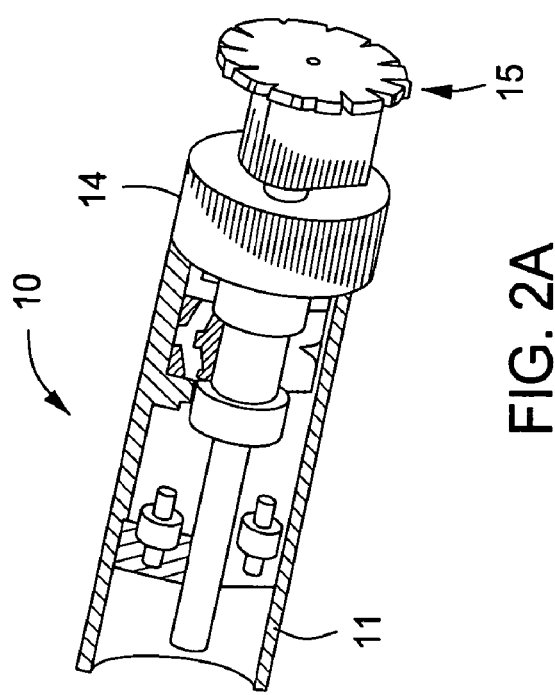

FIGS. 2a and 2b provide examples of how the cutting system 15 may pivot with respect to the cutting head 14. More specifically, FIG. 2a represents the configuration of the cutting tool 10, and its associated cutting system 15, as the tool 10 is moved in and out of a tubular. Whereas, FIG. 2b portrays how the cutting system 15 might be eccentrically pivoted into a cutting position for the cutting of a tubular. Once the tool 10 is disposed within a tubular where a cut is desired the drive system 12 can be activated. Activation of the drive system 12 causes rotation of the drive shaft 24 wherein rotation of the drive shaft in turn can cause rotation of the cutting head 14 as well as rotation of the cutting member 16. As previously discussed, the drive shaft 24 is coupled with the upper transmission 28 via gear teeth formed on their respective surfaces. Thus upon rotation of the drive shaft 24 the rotational energy is transferred from the drive shaft 24 through the upper transmission 28 via the aforementioned gear teeth. Arrows provided on FIG. 1 serve to illustrate an example of how this rotational energy is passed from the drive shaft 24 through this upper transmission 28. More specifically, rotation of the drive shaft 24 thereby produces corresponding rotation in the first gear 30, that in turn through its coupling with the second gear 32 causes rotation of the second gear 32. Because the shaft 33 couples the second gear 32 to the third gear 34, second gear 32 rotational torque is passed onto the third gear 34 via the shaft 33. As noted above, the corresponding teeth on the third gear 34 and the upper end of the cutting head 14 allow mechanical coupling between the third gear 34 and the cutting head 14 that when rotation of the third gear 34 occurs a corresponding rotation of the cutting head 14 will similarly occur. The inner friction of the gear train 20 causes the cutting system 15 to pivot. Thus no minimum rotational velocity of the cutting head 14 is required for the cutting system 15 to pivot out into the asymmetric alignment as illustrated in FIG. 2b. The cutting system 15 starts pivoting as soon as rotation begins. An end stop 22 is provided on the face of the cutting head for limiting the pivoting range of the cutting system 15. The position of the end stop 22 can be adjusted to provide a maximum cutting angle when the cutting member 16 is engaged with a tubular.

The above-described drive shaft 24 rotation similarly rotates the cutting member 16 through the mechanical coupling provided by the gear train 20 and its associated lower transmission 18. In more detail, the inner gear 21 of the gear train 20 that is affixed to the drive shaft 24 rotates due to rotation of the drive shaft 24. Rotation of the inner gear 21 in turn produces corresponding rotation of the radial gear 23. Since the radial gear 23 is mechanically attached to the lower transmission 18, it imparts a rotational force into the inlet of the lower transmission 18. Similarly the first and second cutting member gears (27, 29), that are disposed at the outlet of the lower transmission 18, receive the rotational torque delivered by the lower transmission 18. The first and second cutting member gears (27, 29) transfer the rotational torque output of the lower transmission 18 onto the cutting member 16.

Figure 3:
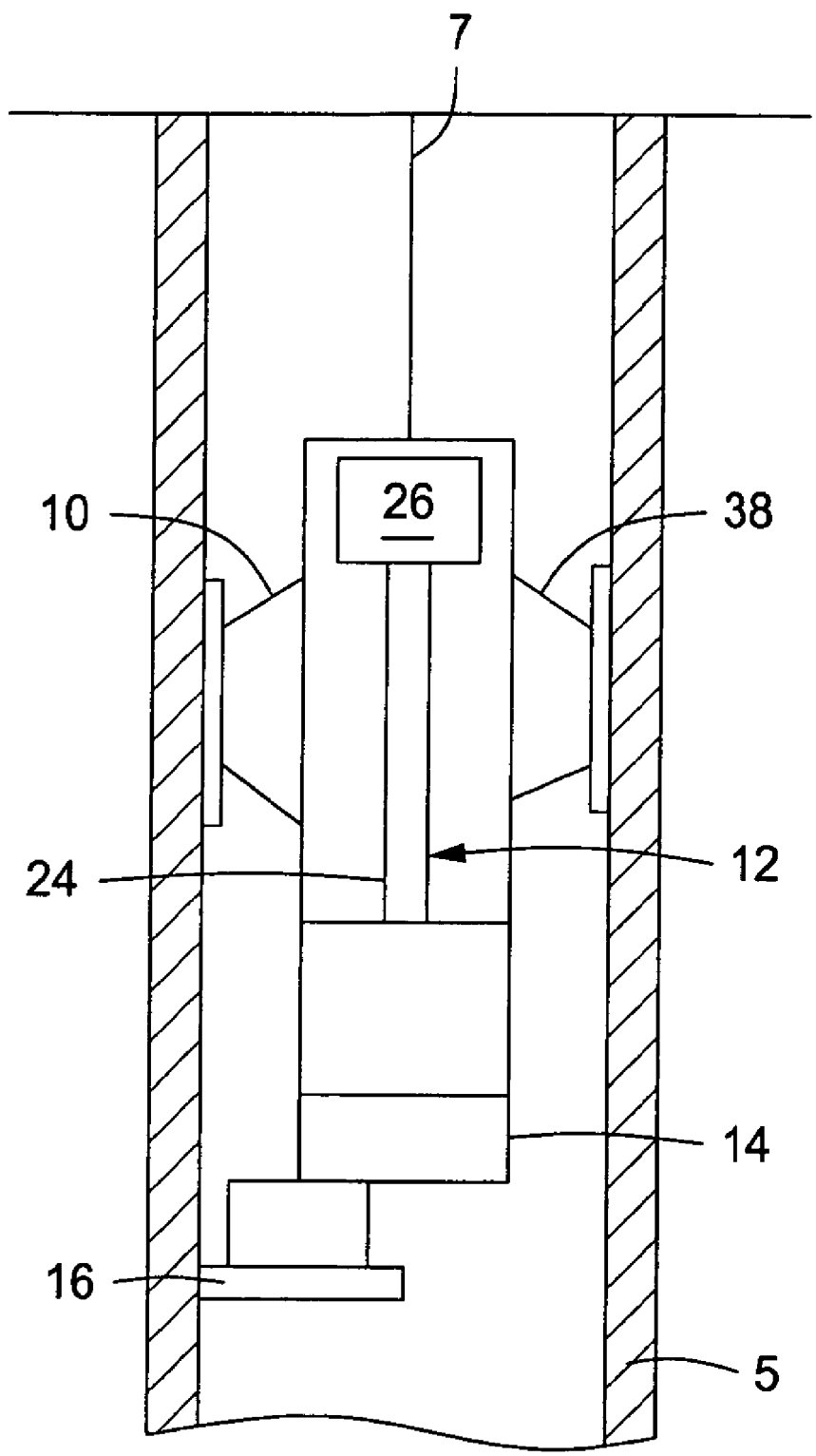
FIG. 3 demonstrates a cutting tool in a tubular.

With reference now to FIG. 3 an illustration is provided demonstrating use of an embodiment of the cutting tool 10 for cutting a tubular. In the example of FIG. 3, the tubular is a wellbore casing 5. It should be pointed out that the motive force used to provide rotation of the drive shaft 24 is a motor 26. The motor 26 can be electric, hydraulic, or driven by any now known or later developed means. Moreover the tool 10 is shown disposed within a wellbore via wireline 7 and is anchored within the casing by an anchor system 38. The anchor system 38 is not limited to a mechanical linkage system like that shown, but can also include other anchoring systems such as those hydraulically actuated in the form of a packer.

With reference now to FIGS. 4a and 4b another embodiment of a cutting tool 10a is provided in a cross-sectional view. The tool 10a of FIGS. 4a and 4b is comprised of a cutting head 14a rotationally coupled on one end of a body 11a. Disposed on the free end of the cutting head 14a is a cutting assembly 50. In this embodiment the drive system comprises a flexible shaft 56 coupled to a cutting member 16a and a shaft 60 in mechanical cooperation with the cutting head 14a. More specifically the shaft 60 extends through the body 11a and parallel to the cutting head 14a wherein a pinion gear 62 is formed on the lower end of the shaft 60. The pinion gear 62 with its mating teeth is formed to cooperatively mate with similar gear teeth fashioned on an inner circumference of the cutting head 14a. The shaft 60 and pinion gear 62 make up the cutting head transmission assembly 58. Also as shown is a sleeve 68 provided around the flexible shaft 56 extending along a portion of the shaft 56. The sleeve 68 extends from within the housing 11a and terminates on its lower end within the upper section of the cutting head 14a. Disposed along the lower end of the sleeve 68 is the pivoting transmission 70. The pivoting transmission 70 is comprised of a pinion gear 72 disposed substantially parallel to the sleeve 68, wherein the pinion gear 72 has corresponding mating teeth formed on its outer circumference. These teeth of the pinion gear 72 are made to mesh with similar gears formed on the outer surface of the sleeve 68. Coaxially formed with the pinion gear 72 is a shaft 74 that extends further into the cutting head 14a and terminates at a pivoting mechanism 40. The pivoting mechanism 40 comprises a worm gear 42, a bevel/worm gear 44, and a helical gear 46 disposed on a shaft 48. The worm gear is affixed on the lower most end of the shaft 74 and is mated with the bevel/worm gear 44 via gear teeth formed on their respective outer surfaces. The bevel/worm gear 44 is disposed substantially perpendicular to the axis of the cutting tool 10*a* and is gearingly coupled on its other end with a helical gear 46. The shaft 48 extends from the helical gear 46 within the cutting head 14*a* (substantially parallel with the axis of the cutting tool 10*a*) and on its lower most end where it is affixed to the cutting assembly 50. Optionally a bolt 54 may be provided on the lower most end of the flexible shaft 56 configured to mate with the threads on the end of the shaft 56 to secure the cutting member 16*a* on the shaft 56. The flexible shaft 56 and the shaft 60 can be driven by a single motor, or each have their own dedicated motors or other means of rotational motivation.

In operation of the embodiment of the cutting tool 10*a* provided in FIGS. 4*a* and 4*b*, the cutting assembly 50 can be taken from the non-cutting position, i.e., substantially aligned with the cutting head 14*a* and/or body 11*a* into a cutting position wherein the outer edges of the cutting member 16*a* are put into cutting contact with a tubular. Pivoting or rotating the cutting assembly 50 can occur simultaneously with rotation of the cutting head 14*a*. The pivoting action is accomplished via providing rotational torque to the pivoting transmission 70. The sleeve 68 is coupled with the flex shaft 56, thereby rotation of the flex shaft 56 will impart a rotational torque onto the sleeve 68. Since the pinion gear 72 is gearingly coupled with the outer surface of the sleeve 68, rotation of the flex shaft 56 necessarily causes rotation of the pinion gear 72. As previously discussed, the shaft 74 is coaxially affixed to the pinion gear 72, such that any rotation of the pinion gear 72 necessarily rotates the shaft 74. As the shaft 74 rotates it rotates the worm gear 42 that then puts a rotational torque on the bevel/worm gear 44. Rotating the bevel/worm gear 44 rotates the helical gear 46 that causes rotation of the shaft 48 and thereby pivoting the cutting assembly 50 out of the coaxial position and into a symmetric position for cutting a tubular. Arrows are provided on FIG. 4*b* illustrate how forces are transferred from the flexible shaft 56 for pivoting the cutting assembly 50. As shown in FIG. 4*a*, the flex shaft can bend along its length thereby accommodating this pivoting action of the cutting assembly 50. Coupling the flex shaft with the cutting member 16*a* results in rotation of the cutting member 16*a* upon rotation of the flex shaft 56.

Imparting a rotational torque onto the shaft 60 in turn rotates the pinion gear 62 to produce cutting head rotation; mating gears on the inner circumference of the cutting head 14*a* transmit force for rotating the cutting head 14*a*. Thus rotational torque applied to both the flex shaft 56 in conjunction with the shaft 60 can take the cutting assembly 50 of FIGS. 4*a* and 4*b* into cutting engagement with a tubular and impart a radial cut onto a tubular engaged by this cutting tool 10*a*. Bearings 64 are shown disposed in a cavity formed at a portion of the interface between the cutting head 14*a* and the body 11*a*. In one embodiment, monitoring the revolutions of the cutting head controls the pivoting angle of the cutting assembly 50. Recording cutting head revolutions enables calculating the cutting head 14 position.

FIGS. 5*a* through 5*e* provide yet another embodiment of a cutting tool 10*b* in accordance with the description provided herein. With respect now to FIGS. 5*a* through 5*c*, an embodiment of a cutting tool 10*b* is provided comprising a housing 11*b* with a rotating cutting head 14*b* disposed one end of the body 11*b*. On the cutting head 14*b* is shown a cutting member 16*b*. The cutting member 16*b* of this embodiment comprises cutting elements 78, wherein the cutting elements lie substantially in a plane that is perpendicular to the axis of the cutting tool 10*b*. The cutting members as shown are disposed on the face of the cutting head 14*b* at a radial distance away from the cutting head axis. The cutting elements 78 are pivotingly attached to the cutting head 14*b*, this pivoting capability is illustrated in FIGS. 5*a* through 5*c*.

With specific regard now to FIG. 5*a*, the cutting elements 78 are shown in a fully retracted configuration where the outer surface of the cutting elements 78 do not extend outside the outer radius of the cutting head 14*b*. The pivoting action is sequentially demonstrated in FIGS. 5*a* and 5*c*, i.e. FIG. 5*a* shows fully retracted elements 78, FIG. 5*b* has partially extended elements 78, and FIG. 5*c* demonstrates fully extended elements 78. With regard now to FIG. 5*b*, the cutting elements 78 are extending just past the outer radius of the cutting head 14*b* on their pivoting attachment and FIG. 5*c* illustrates a fully extended cutting element 78 wherein the outer diameter of the cutting elements is substantially at their maximum point.

A bottom view of the tool 10*a* at the face of the cutting head 14*b* is provided in FIG. 5*d*. Also shown is an optional synchronizing member 80 that is in synchronizing contact with both of the cutting members 78. It should be pointed out however that while these figures provide two cutting elements 78, one cutting element, or more than two cutting elements, could be used with the embodiments of these figures. The synchronizing member 80 optionally could be fitted with a series of gear teeth formed for mating cooperation with the outer surface of the cutting elements 78. The presence of the synchronizing member 80 serves to ensure that the cutting elements 78 pivot from their retracted position of FIG. 5*a* and advance outward into their fully extended position as shown in FIG. 5*c* at substantially the same rate of extension. Controlling the rate of extension of the cutting elements 78 is accomplished by virtue of their synonymous coupling with the synchronizing member 80.

With reference now to FIG. 5*e* a cut away view of an embodiment of the cutting tool 10*b* is provided. This depiction illustrates that the body 11*b* is formed to coaxially receive the cutting head 14*b* along one of its ends. Bearings 82 can be provided in the space between the outer surface of the cutting head 14*b* and the inner circumference of the housing 11*b* to facilitate rotation of the cutting head 14*b* with respect to the body 11*b* thereby minimizing any rotational friction there between. In this embodiment, the cutting elements 78 are shown in their maximum extended position. Moreover corresponding teeth 84 are provided for illustration to demonstrate how one example of the synchronizing effect between each cutting element 78 and the synchronizing member 80. Substantially cylindrical recesses are provided for receiving the shaft portion (79, 81) of each cutting element 78 as well as the synchronizing member 80.

Operation of the embodiments shown in FIGS. 5*a* through 5*b* is accomplished by providing rotational torque to the cutting head 14*b*. This rotational torque, via centrifugal force of the cutting elements, outwardly pivots the cutting elements 78 into cutting engagement with a tubular member. The outer surface 83 of the cutting elements 78 can be formed in the angular fashion as shown to provide a lower frictional cut for enhancing the cutting of the tubulars. The arrow provided in FIG. 5*d* is one example of rotational torque direction that could be imparted onto the cutting head for the cutting head of a tubular. The outer surface 83 of the cutting elements 78 can be formed into a beveled shape having a blade like configuration for cutting, and optionally can have other abrasive surfaces for grinding, cutting, sawing, and/or milling a tubular.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, the device is not limited to being wireline conveyed, but can be suspended by any known means, such as tubing, coiled tubing, or slickline as well as any later developed means. Additionally, the device can be used in conjunction with downhole drilling or other boring operations. Moreover, it should be pointed out that the force and/or torque transmission systems heretofore described are not limited to the embodiments described, but can also include belt systems, pulleys, linkages, and any other manner of transferring kinetic (rotational, translational, or otherwise) energy from one member to another. These and other similar modifications will readily suggest themselves to those skilled in the art, and are intended to be encompassed within the spirit of the present invention disclosed herein and the scope of the appended claims.

What is claimed is:

1. A cutting tool for cutting a tubular comprising:
   a drive system;
   a cutting head mechanically coupled to the drive system; and
   a cutting member pivotally mounted on the cutting head, wherein the cutting member is in mechanical communication with the drive system and wherein the cutting member pivots about a line that is offset from the cutting head axis.

2. The cutting tool of claim 1 further comprising a transmission coupled on one end to the cutting head and on the other end to the cutting member.

3. The cutting tool of claim 2, wherein the transmission comprises a gear train adapted for mechanical coupling the drive system and the cutting member.

4. The cutting tool of claim 2, wherein the cutting member is selected from the list consisting of a cutting blade, a cutting disk, a milling disk, a grinding disk, a sawing blade, and combinations thereof.

5. The cutting tool of claim 1, wherein rotation of the cutting head pivots the cutting member into a cutting position.

6. The cutting tool of claim 1, further comprising a pivot angle control end stop disposed on the cutting head.

7. The cutting tool of claim 6, wherein the pivot angle control end stop controls the angular pivoting range of the cutting member.

8. The cuffing tool of claim 1, wherein the drive system comprises a drive shaft coupled to a rotational motive device.

9. The cutting tool of claim 8, wherein the rotational motive device is a motor.

10. The cuffing tool of claim 8, further comprising an upper transmission, wherein the drive shaft is in mechanical cooperation to the cuffing head via the upper transmission.

11. The cuffing tool of claim 8, further comprising a lower transmission, wherein the drive shaft is in mechanical cooperation to the cutting member via the lower transmission.

12. The cuffing tool of claim 1, wherein the cuffing member pivots along a plane lying substantially perpendicular to the axis of the cutting tool.

13. The cuffing tool of claim 1 further comprising a pivoting mechanism coupled to the cuffing member.

14. The cuffing tool of claim 13 wherein the pivoting mechanism is further operatively coupled to the drive system, thereby providing mechanical communication between the drive system and the cuffing member for pivoting the cutting member into a cutting position.

15. The cuffing tool of claim 13 wherein the drive system comprises a flexible shaft coupled on one end to a motive device and on its other end to the cuffing member.

16. The cuffing tool of claim 13 further comprising a cuffing head transmission mechanically coupling the drive system to the cutting head.

17. The cuffing tool of claim 13 further comprising a pivoting transmission coupling the drive system to the pivoting mechanism.

18. The cutting tool of claim 1, wherein the tool is disposable downhole.

* * * * *